United States Patent
Elati et al.

(10) Patent No.: US 12,341,709 B2
(45) Date of Patent: Jun. 24, 2025

(54) CONFIGURABLE RECEIVE BUFFER SIZE

(71) Applicant: Intel Corporation, Santa Clara, CA (US)

(72) Inventors: Noam Elati, Zichron Yaakov (IL); Boris Kleiman, Rishon LeZion (IL); Piotr Uminski, Gdynia (PL)

(73) Assignee: Intel Corporation, Santa Clara, CA (US)

(*) Notice: Subject to any disclaimer, the term of this patent is extended or adjusted under 35 U.S.C. 154(b) by 763 days.

(21) Appl. No.: 17/359,542

(22) Filed: Jun. 26, 2021

(65) Prior Publication Data

US 2021/0328945 A1    Oct. 21, 2021

(51) Int. Cl.
*H04L 47/52* (2022.01)
*H04L 49/9005* (2022.01)
*H04L 49/901* (2022.01)
*H04L 49/9047* (2022.01)

(52) U.S. Cl.
CPC ........ *H04L 49/9005* (2013.01); *H04L 49/901* (2013.01); *H04L 49/9047* (2013.01)

(58) Field of Classification Search
None
See application file for complete search history.

(56) References Cited

U.S. PATENT DOCUMENTS

2019/0280991 A1* 9/2019 Singh .................. H04L 47/6215

OTHER PUBLICATIONS

AN3966 Application note, "LwIP TCP/IP stack demonstration for STM32F4x7 microcontrollers", DocID022105 Rev. 2, Jul. 2013, 48 pages.
Cutress, Ian, "Intel Columbiaville: 800 Series Ethernet at 100G, with ADQ and DDP", https://www.anandtech.com/show/14148/intel-columbiaville-800-series-ethernet-at-100g-with-adq-and-ddp, Apr. 2, 2019, 3 pages.
Intel Networking Division, "Intel® Ethernet Adaptive Virtual Function (AVF) Hardware Architecture Specification (HAS)", Revision: 1.0, Feb. 2018, 90 pages.
Intel® Ethernet Products Group (EPG), "Intel® Ethernet Controller E810 Data Plane Development Kit (DPDK) 20.05 Configuration Guide", Revision 2.1, Aug. 2020, 38 pages.
Oasis, "Virtual I/O Device (VIRTIO) Version 1.1", Committee Specification 01, Apr. 11, 2019, 166 pages.

(Continued)

*Primary Examiner* — Willie J Daniel, Jr.
(74) *Attorney, Agent, or Firm* — Compass IP Law PC

(57) ABSTRACT

Examples described herein relate to a network interface device comprising circuitry to: allocate a first number of buffers to store received packets associated with a first descriptor ring; allocate a second number of buffers to store received packets associated with a second descriptor ring; and based on receipt of a packet, copy the received packet into a number of buffers based on whether the received packet is associated with the first descriptor ring or the second descriptor ring. In some examples, the circuitry is to copy the received packet starting at an offset from a start of a starting buffer in a number of buffers, wherein the offset is based on whether the received packet is associated with the first descriptor ring or the second descriptor ring and wherein the number of buffers is based on whether the received packet is associated with the first descriptor ring or the second descriptor ring.

21 Claims, 5 Drawing Sheets

(56) References Cited

OTHER PUBLICATIONS

Pirelli, Solal and Candea, George, "A Simpler and Faster NIC Driver Model for Network Functions", Proceedings of the 14th USENIX Symposium on Operating Systems Design and Implementation, Nov. 2020, 18 pages.
VMware, Inc., "Performance Evaluation of VMXNET3 Virtual Network Device", Performance Study, Latest Version Aug. 11, 2009, 10 pages.

* cited by examiner

CONFIGURABLE RECEIVE BUFFER SIZE

BACKGROUND

A network interface device can copy a received packet to a receive buffer allocated in memory. Operating system (OS) drivers can use fixed-size buffers that are either entire pages or a fraction of a page. Accordingly, some network interface devices write received packets to fixed size receive buffers. A receive descriptor can identify a buffer size and location in a memory device. In advance of packet receipt, software prepares one or more memory buffers to store received network packets with enough memory to be able to store an entire received packet. Some network interface devices provide two rings of receive descriptors with two kinds of fixed sized buffers, namely, a buffer for packet headers and a second buffer for packet payloads. A buffer associated with a first ring is a fixed, pre-defined size whereas a buffer associated with a second ring is a fixed, pre-defined size, which may be the same or different in size as that associated with the first ring.

Emulated network devices such as virtio-networking and VMXNET3 specify use of variable sized receive buffers where a buffer is described by the descriptor that specifies its buffer address and buffer length. For example, VMXNET3 defines two receive descriptor rings, namely on ring associated buffers for packet header and a ring associated with variable size buffers for packet payloads.

DETAILED DESCRIPTION

A network interface device can be programmed to copy packet header and/or packet payload to configurable sized buffers. The size of a received packet buffer can be dynamically configured. The network interface device can be programmed by a driver and/or operating system (OS) at least with (a) number of buffers in which to store one or more portions of a received packet as a number of descriptors from which to access a receive descriptor ring that references fixed-size buffers per received packet and (b) an offset into a first buffer in the number of buffers at which to start copying a portion of the received packet. The one or more portions of the received packet can include a packet header and/or a packet payload. The offset can allow the first buffer in a group of buffers to store packet metadata and to adjust a total size of a received packet buffer. For example, packet metadata can include a virtio-net net header. A descriptor can include a starting address in memory of a receive buffer and a size of the receive buffer. An upper size of a received packet can be determined based on the network Maximum Transfer Unit (MTU) and Receive Segmentation Offloading (RSO) parameters. For example, the network interface device can support virtio-networking and VMXNET3 or other emulated network devices that utilize variable sized buffers. For example, virtio-net and VMXNET3 interfaces can be used where a network interface device can store received packets directly into the buffers provided by virtio-net or VMXNET3 interface instead of copying the variable-sized received packets from a first buffer to a destination buffer.

In response to receipt of a packet, the network interface device can read N number of descriptors corresponding to the configuration of the number of descriptors from which to access a receive descriptor ring. In some examples, different connections can provide different upper sizes (e.g., MTU) of transmitted packets. In some examples, received packets accessed by a first virtualized execution environment (e.g., virtual machine (VM) or container) are a different size than the received packets accessed by a second virtualized execution environment. Different descriptor rings (e.g., receive and/or transmit descriptor rings) can be allocated to different connections, virtualized execution environments, or queues.

Figure 1:
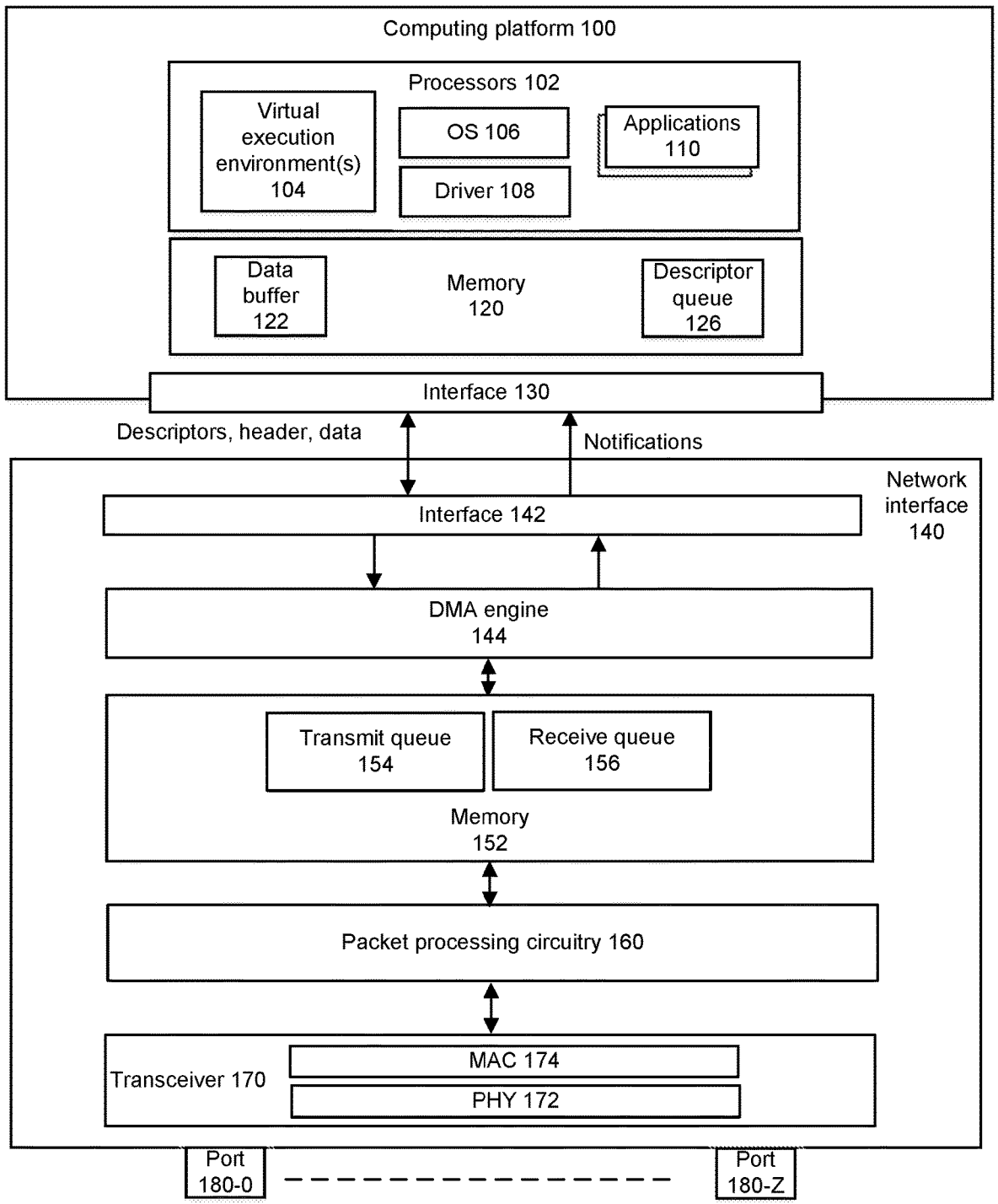
FIG. 1 depicts an example system.

FIG. 1 depicts an example system. In this system, computing platform 100 can provide data for transmission and/or receive data in packets through network interface 140. Computing platform 100 can include at least various processors 102 and memory 120. Processors 102 can execute virtual execution environment 104, operating system 106, network interface driver (or device driver) 108, and applications 110. Processors 102 can be an execution core, computational engine, or accelerator that is capable of executing instructions. A core can have access to its own cache and read only memory (ROM), or multiple cores can share a cache or ROM. Cores can be homogeneous and/or heterogeneous devices. Any type of inter-processor communication techniques can be used, such as but not limited to messaging, inter-processor interrupts (IPI), inter-processor communications, and so forth. Cores can be connected in any type of manner, such as but not limited to, bus, ring, or mesh. Processors 102 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. Virtual execution environment 104 can include one or more of a virtual machine or container.

In some examples, operating system 106 can be any of Linux®, Windows® Server, FreeBSD, Android®, MacOS®, iOS®, Cisco IOS, Juniper Junos, or any other operating system. Operating system 106 and applications 110 can run within a virtual execution environment 104 or outside of virtual execution environment 104. In some examples, applications 110 run within a virtual execution environment 104 or outside of virtual execution environment 104. Note that reference to microservice, application, function, process, routine, or service can be used interchangeably such that reference to one can refer to one or more of a microservice, application, function, process, routine, or service.

OS 106 can configure network interface 140 using configuration registers or memory regions via driver 108. Using an application program interface (API), command line interface (CLI), or procedure call to driver 108, OS 106 can configure per-descriptor ring parameters of network interface 140. For example, per-descriptor ring parameters can include one or more of: connection ID (e.g., n tuple or hash n tuple), number of descriptors, and offset into a memory or memory buffer at which the descriptor ring is stored. Driver 108 can provide an interface between virtual execution environment 104, applications 110, or operating system (OS) 106 and network interface 140. Driver 108 can create a receive descriptor ring in a region of memory. Descriptors

126 can refer to a particular region of memory in which a buffer 122 is allocated to store received packets. Driver 108 can identify the descriptor ring to network interface 140 and include parameters that identify a number of descriptors to access for a received packet and an offset into a buffer in a group of one or more buffers that are to store received packets, where the offset is a start of where a received packet is written. In some cases, variable buffer sizes for received packets can be used in implementations of virtual devices such as virtio-net or VMXNET3. For example, packet metadata (e.g., virtio-net net header) can be stored in the buffer in the offset region before a start of a received packet.

Note that in some examples, transmit descriptors can be made available to network interface 140 and one or more transmit descriptors can refer to header and data to be transmitted by network interface 140 to a next network interface device.

Interface 130 and interface 142 can provide communicative coupling between platform 100 and network interface 140. For example, communicative coupling can be based on Peripheral Component Interconnect express (PCIe), Compute Express Link (CXL), or any public or proprietary standard. Network interface 140 can be implemented as one or more of: a network interface controller (NIC), SmartNIC, router, switch, forwarding element, infrastructure processing unit (IPU), data processing unit (DPU), or smart end point. A smart end point can include a network interface device that is accessible as an accelerator, storage, or memory device by a microservice and can provide translation between protocols used by a requester microservice and the accelerator, storage, or memory device.

Direct memory access (DMA) engine 144 can transfer data and corresponding packet descriptor to or from memory 152. Packets to be transmitted, or portions thereof, and received packets, or portions thereof, can be stored in respective transmit queue 154 and receive queue 156. DMA technology can be used to copy packet portions from computing platform 100 to transmit queue 154. DMA technology can be used to copy packet portions from receive queue 156 to computing platform 100. DMA is a technology that allows an input/output (I/O) device to bypass a central processing unit (CPU) or core, and to send or receive data directly to or from a system memory. Because DMA allows the CPU or core to not manage a copy operation when sending or receiving data to or from the system memory, the CPU or core can be available to perform other operations.

Packet processing circuitry 160 can be programmed to copy a packet header and/or packet payload to configurable sized buffers 122. Packet processing circuitry 160 can be programmed by a driver and/or operating system (OS) with a number of buffers in a group of buffers in which to store a received packet based on a number of descriptors from which to access a receive descriptor ring 126. Packet processing circuitry 160 can be configured with an offset into a first buffer in the group of buffers at which to start copying a portion of the received packet. In response to receipt of a packet, packet processing circuitry 160 can read N number of descriptors corresponding to the configuration of the number of descriptors from which to access a receive descriptor ring and copy the portion of the received packet into the N buffers at or after the offset.

Packet processing circuitry 160 can be configured with a cumulative size of one or more buffers allocated to store received packets per connection or flow. Packet processing circuitry 160 can implemented as one or more of: a processor, core, graphics processing unit (GPU), field programmable gate array (FPGA), application specific integrated circuit (ASIC), or other programmable hardware device that allow programming of network interface 1600.

Transceiver 170 can be capable of receiving and transmitting packets in conformance with the applicable protocols such as Ethernet as described in IEEE 802.3, although other protocols may be used. Transceiver 170 can receive and transmit packets from and to a network via a network medium (not depicted). Transceiver 170 can include PHY circuitry 172 and media access control (MAC) circuitry 174. PHY circuitry 172 can include encoding and decoding circuitry (not shown) to encode and decode data packets. MAC circuitry 174 can be configured to assemble data to be transmitted into packets, that include destination and source addresses along with network control information and error detection hash values. Network interface 140 includes one or more ports 180-0 to 180-Z. A port can represent a physical port or virtual port. A packet can be transmitted or received using ports 180-0 to 180-Z.

A packet may be used herein to refer to various formatted collections of bits that may be sent across a network, such as Ethernet frames, IP packets, TCP segments, UDP datagrams, etc. Also, as used in this document, references to L2, L3, L4, and L7 layers (layer 2, layer 3, layer 4, and layer 7) are references respectively to the second data link layer, the third network layer, the fourth transport layer, and the seventh application layer of the OSI (Open System Interconnection) layer model.

A flow can be a sequence of packets being transferred between two endpoints, generally representing a single session using a known protocol. Accordingly, a flow can be identified by a set of defined tuples and, for routing purpose, a flow is identified by the two tuples that identify the endpoints, e.g., the source and destination addresses. For content-based services (e.g., load balancer, firewall, Intrusion detection system etc.), flows can be discriminated at a finer granularity by using N-tuples (e.g., source address, destination address, IP protocol, transport layer source port, and destination port). A packet in a flow is expected to have the same set of tuples in the packet header. A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier.

Figure 2:
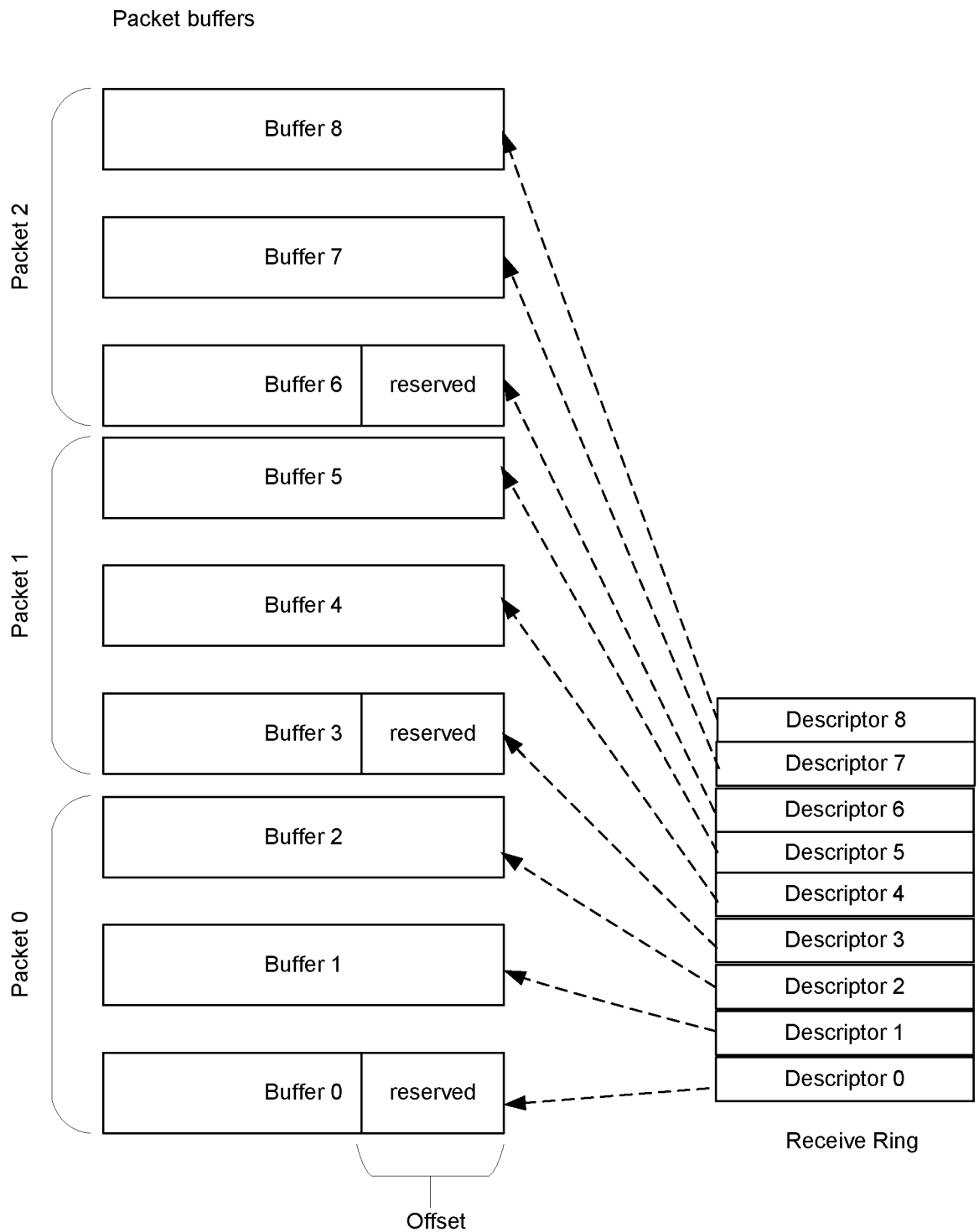
FIG. 2 depicts a sequence of allocation of buffers to received packets.

FIG. 2 depicts a sequence of allocation of buffers to received packets. In this example, a number of buffers allocated to store a received packet can be allocated prior to receipt of a packet at the network interface device and configured using a driver and/or operating system (OS). Descriptors 0-8 can include pointers to memory addresses (virtual or physical) of respective buffers 0 to 8, where in some examples, buffers 0 to 8 are a same size. At least descriptors 0, 3, and 6 can include at least one offset into respective buffers 0, 3, and 6 where the offset is an offset from a start of a buffer to which to copy packet data (e.g., header or payload). For example, a received packet 0 can be stored buffers 0-2 starting at or after an offset into buffer 0. For example, a received packet 1 can be stored buffers 3-5 starting at or after an offset into buffer 3. For example, a received packet 2 can be stored buffers 6-8 starting at or after an offset into buffer 6. For example, packet or other metadata information can be written into a reserved space in each of buffers 0, 3, and 6.

Note that in some examples, network interface 140 can utilize less than a number of descriptors, and corresponding buffers, allocated per received packet if a size of the portion of the received packet can be stored in fewer buffers than allocated per-received packet.

Figure 3:
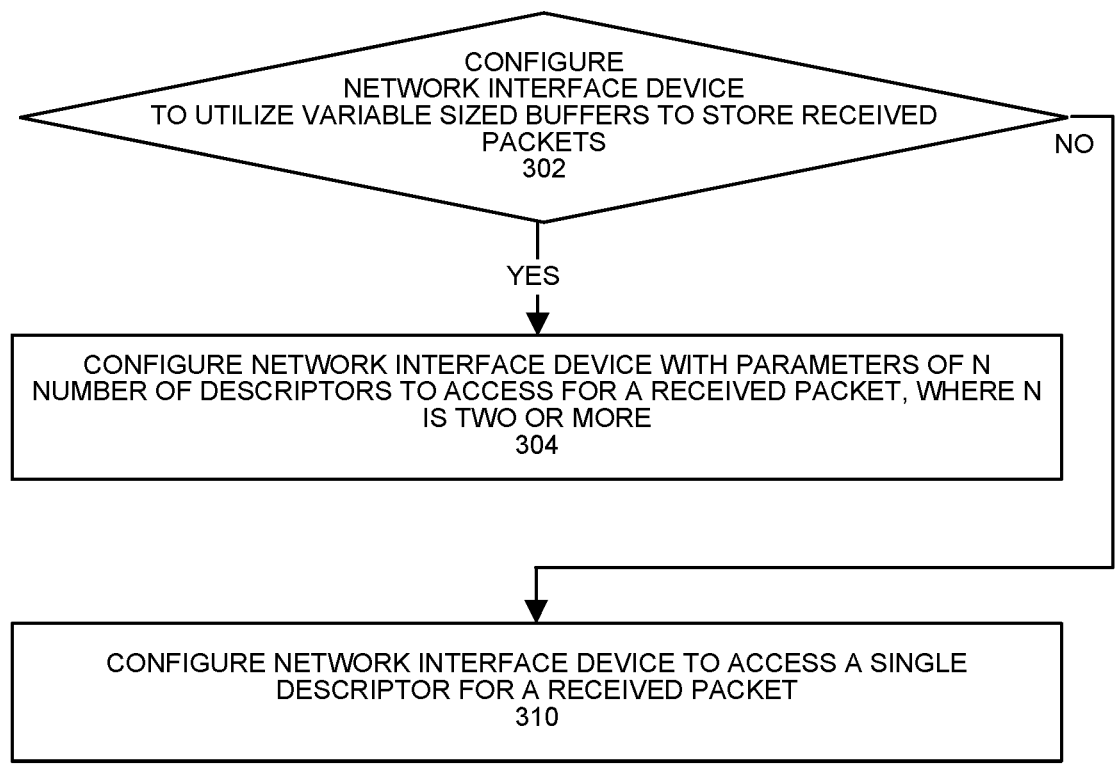
FIG. 3 depicts an example process.

FIG. 3 depicts an example process. The process can be performed by a driver and/or operating system (OS). At 302, a determination can be made if one or more variable size buffers are to be utilized to store received packets. A variable sized buffer can be used if a received packet and related meta data are to be stored in a receive buffer that is a multiple of a unit of buffer size, where the multiple can be greater than 1. A unit of buffer size can represent a buffer size available in a memory from a driver and/or OS. If one or more variable size buffers are to be utilized to store received packets, the process can continue to 304. If one or more unit size buffers are to be utilized to store received packets, the process can continue to 310.

At 304, the network interface device can be configured with receive descriptor ring parameters. Parameters can include one or more of: location in memory of a descriptor ring, number of descriptors available in a ring, descriptor size, number N of descriptors to retrieve per received packet, and offset from a start of a first buffer in N buffers associated with N descriptors. For example, a driver can write the parameters to registers on the network interface device.

At 310, the network interface device can be configured to retrieve a single receive descriptor for a received packet.

Note that a cumulative size of one or more buffers allocated to store received packets can be adjusted after configuration. Note that a cumulative size of one or more buffers allocated to store received packets can be configured per queue and a queue can serve one or more connections or flows.

Figure 4:
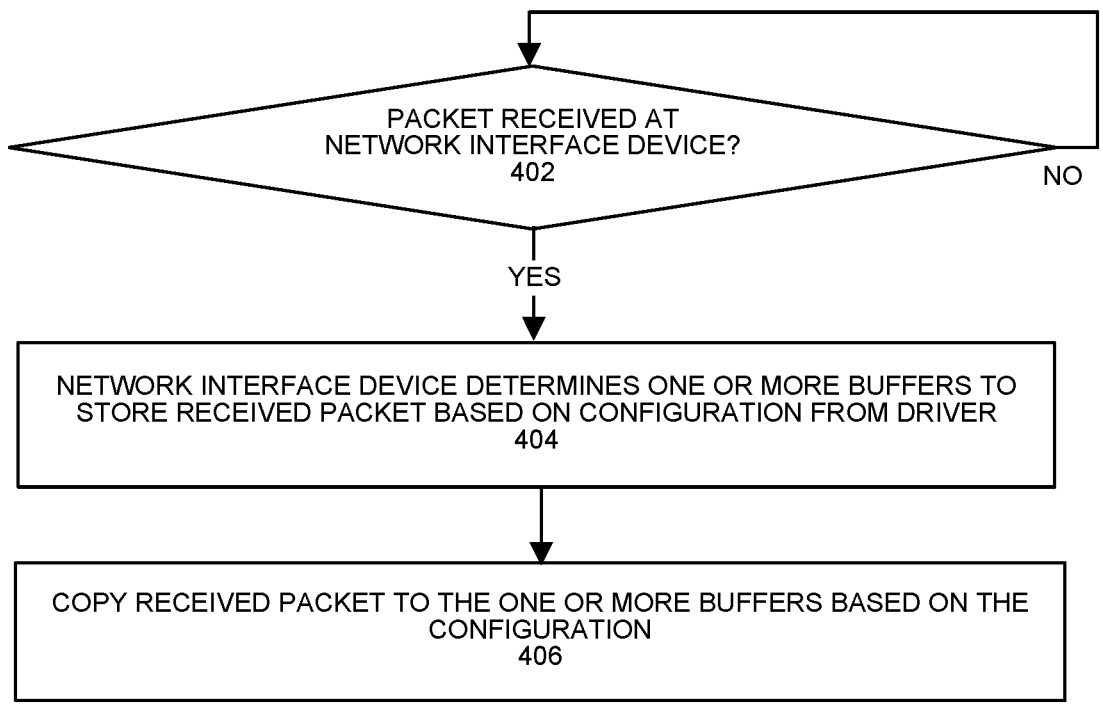
FIG. 4 depicts an example process.

FIG. 4 depicts an example process. The process can be performed by a network interface device. At 402, a determination can be made if a packet has been received. Based on a determination that a packet has been received, the process can continue to 404. Based on a determination that a packet has not been received, the process can repeat 402.

At 404, determine buffer to store received packet into based on configuration from driver and/or operating system (OS). Configuration can include a number N of buffers in which to store a received packet as a number of descriptors from which to access a receive descriptor ring that references fixed-size buffers per received packet and an offset into a first buffer in the number N of buffers at which to start copying a portion of the received packet. The value N can be an integer of 1 or more.

At 406, the network interface device can copy the received packet to the N buffer(s) associated with a receive descriptor. If the configuration indicates N is 1, the network interface device can identify 1 buffer in which to copy the received packet. An offset may or may not be used from a start of the 1 buffer in which to copy the received packet. If the configuration indicates N is 2 or more, the network interface device can identify 2 or more buffers in which to copy the received packet, subject to the offset from a start of a beginning or first buffer in the N buffers. The network interface device can identify starting locations and sizes of buffers based on the N descriptors. A DMA engine can be used to copy the packet header and/or payload.

Figure 5:
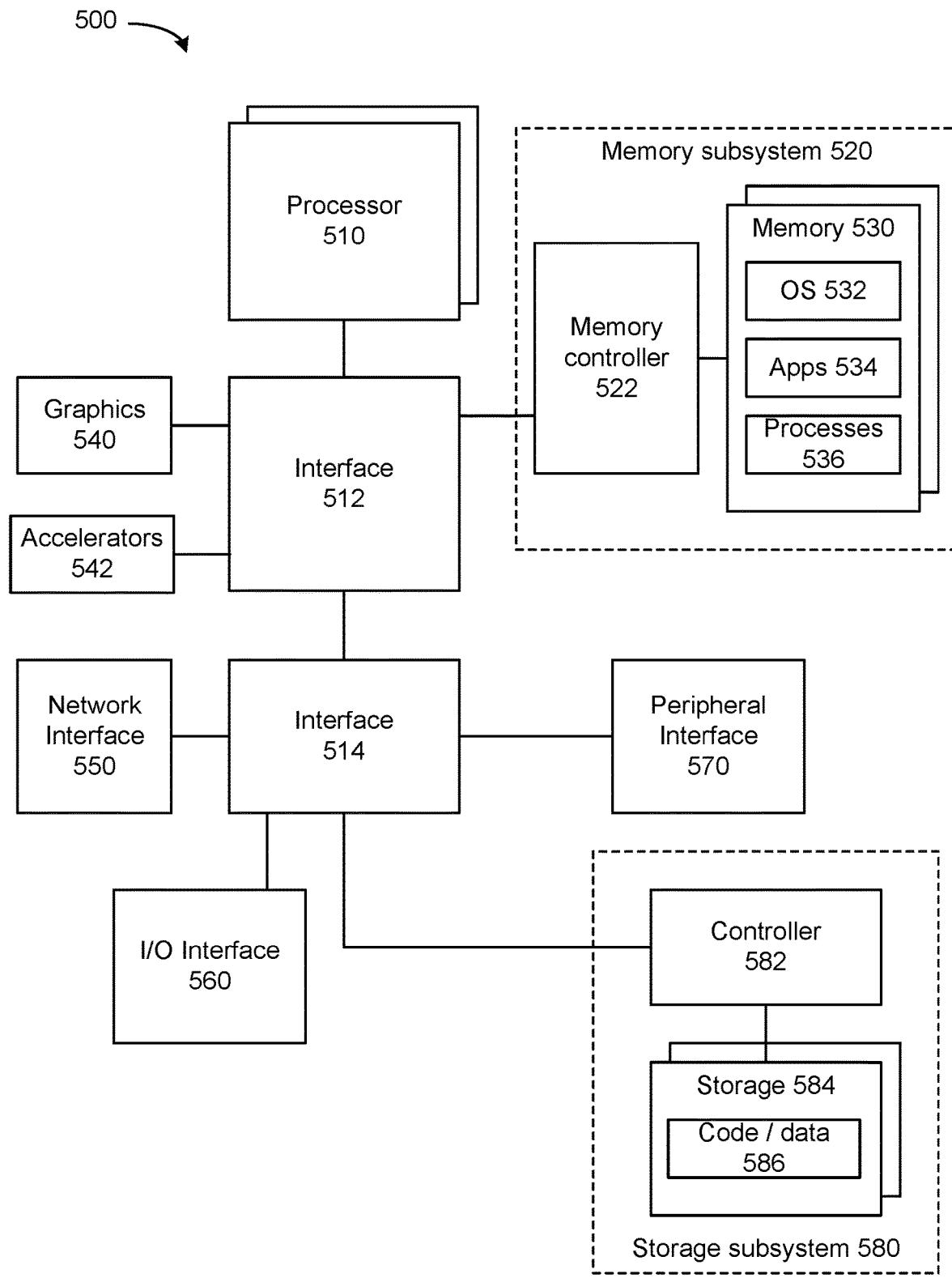
FIG. 5 depicts a system.

FIG. 5 depicts an example computing system. Components of system 500 (e.g., processor 510, network interface 550, and so forth) can utilize one or more descriptors per received packet to store packets that exceed a single buffer size as described herein. System 500 includes processor 510, which provides processing, operation management, and execution of instructions for system 500. Processor 510 can include any type of microprocessor, central processing unit (CPU), graphics processing unit (GPU), processing core, or other processing hardware to provide processing for system 500, or a combination of processors. Processor 510 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 500 includes interface 512 coupled to processor 510, which can represent a higher speed interface or a high throughput interface for system components that needs higher bandwidth connections, such as memory subsystem 520 or graphics interface components 540, or accelerators 542. Interface 512 represents an interface circuit, which can be a standalone component or integrated onto a processor die. Where present, graphics interface 540 interfaces to graphics components for providing a visual display to a user of system 500. In one example, graphics interface 540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 540 generates a display based on data stored in memory 530 or based on operations executed by processor 510 or both. In one example, graphics interface 540 generates a display based on data stored in memory 530 or based on operations executed by processor 510 or both.

Accelerators 542 can be a fixed function or programmable offload engine that can be accessed or used by a processor 510. For example, an accelerator among accelerators 542 can provide compression (DC) capability, cryptography services such as public key encryption (PKE), cipher, hash/authentication capabilities, decryption, or other capabilities or services. In some embodiments, in addition or alternatively, an accelerator among accelerators 542 provides field select controller capabilities as described herein. In some cases, accelerators 542 can be integrated into a CPU socket (e.g., a connector to a motherboard or circuit board that includes a CPU and provides an electrical interface with the CPU). For example, accelerators 542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 542 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 520 represents the main memory of system 500 and provides storage for code to be executed by processor 510, or data values to be used in executing a routine. Memory subsystem 520 can include one or more memory devices 530 such as read-only memory (ROM), flash memory, one or more varieties of random access memory (RAM) such as DRAM, or other memory devices, or a combination of such devices. Memory 530 stores and hosts, among other things, operating system (OS) 532 to provide a software platform for execution of instructions in system 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software logic to provide functions for system 500. In one example, memory subsystem 520 includes memory controller 522, which is a memory controller to generate and issue commands to memory 530. It will be understood that memory controller 522 could be a physical part of processor 510 or a physical part of interface 512. For example, memory controller 522 can be an integrated memory controller, integrated onto a circuit with processor 510.

In some examples, OS 532 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. In some examples, a driver can configure network interface 550 to utilize a descriptor for a received packet or multiple descriptors per received packet to store the received packets that exceed a single buffer size as described herein.

While not specifically illustrated, it will be understood that system 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire). In some examples, a service mesh can be used to provide microservice-to-microservice communications among microservices running on a same or different platforms.

In one example, system 500 includes interface 514, which can be coupled to interface 512. In one example, interface 514 represents an interface circuit, which can include standalone components and integrated circuitry. In one example, multiple user interface components or peripheral components, or both, couple to interface 514. Network interface 550 provides system 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can transmit data to a device that is in the same data center or rack or a remote device, which can include sending data stored in memory. Network interface 550 can receive data from a remote device, which can include storing received data into memory.

Some examples of network interface 550 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 500 includes one or more input/output (I/O) interface(s) 560. I/O interface 560 can include one or more interface components through which a user interacts with system 500 (e.g., audio, alphanumeric, tactile/touch, or other interfacing). Peripheral interface 570 can include any hardware interface not specifically mentioned above. Peripherals refer generally to devices that connect dependently to system 500. A dependent connection is one where system 500 provides the software platform or hardware platform or both on which operation executes, and with which a user interacts.

In one example, system 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a nonvolatile manner, such as one or more magnetic, solid state, or optical based disks, or a combination. Storage 584 holds code or instructions and data 586 in a persistent state (e.g., the value is retained despite interruption of power to system 500). Storage 584 can be generically considered to be a "memory," although memory 530 is typically the executing or operating memory to provide instructions to processor 510. Whereas storage 584 is nonvolatile, memory 530 can include volatile memory (e.g., the value or state of the data is indeterminate if power is interrupted to system 500). In one example, storage subsystem 580 includes controller 582 to interface with storage 584. In one example controller 582 is a physical part of interface 514 or processor 510 or can include circuits or logic in both processor 510 and interface 514.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 500. More specifically, power source typically interfaces to one or multiple power supplies in system 500 to provide power to the components of system 500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 500 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising: a network interface device comprising circuitry to: allocate a first number of buffers to store received packets associated with a first descriptor ring; allocate a second number of buffers to store received packets associated with a second descriptor ring; and based on receipt of a packet, copy the received packet into a number of buffers based on whether the received packet is associated with the first descriptor ring or the second descriptor ring.

Example 2 includes one or more examples, wherein the circuitry is to: copy the received packet starting at an offset from a start of a starting buffer in a number of buffers, wherein the offset is based on whether the received packet is associated with the first descriptor ring or the second descriptor ring and wherein the number of buffers is based on whether the received packet is associated with the first descriptor ring or the second descriptor ring.

Example 3 includes one or more examples, wherein an offset associated with the first descriptor ring is different than an offset associated with the second descriptor ring.

Example 4 includes one or more examples, wherein the first descriptor ring is associated with a first virtualized execution environment and the second descriptor ring is associated with a second virtualized execution environment.

Example 5 includes one or more examples, wherein the first descriptor ring is associated with a first flow and the second descriptor ring is associated with a second flow.

Example 6 includes one or more examples, wherein the network interface device comprises one or more of: a network interface controller (NIC), SmartNIC, router, switch, forwarding element, infrastructure processing unit (IPU), data processing unit (DPU), or smart end point.

Example 7 includes one or more examples, wherein the received packet is accessed by one or more virtualized execution environments as virtio-networking or VMXNET3 virtual devices.

Example 8 includes one or more examples, and includes a host device to execute a driver to configure the circuitry with: the first number of buffers to store received packets associated with the first descriptor ring, an offset into a buffer to store a received packet associated with the first descriptor ring, the second number of buffers to store received packets associated with the second descriptor ring, and an offset into a buffer to store a received packet associated with the second descriptor ring.

Example 9 includes one or more examples, and includes a computer-readable medium comprising instructions stored thereon, that if executed by one or more processors, cause the one or more processors to: execute a driver to configure a network interface device, when operational, to: allocate a first number of buffers to store received packets associated with a first descriptor ring; allocate a second number of buffers to store received packets associated with a second descriptor ring; and based on receipt of a packet, copy the received packet into a number of buffers based on whether the received packet is associated with the first descriptor ring or the second descriptor ring.

Example 10 includes one or more examples, wherein the driver is to configure the network interface device, when operational, to copy the received packet starting at an offset from a start of a starting buffer in a number of buffers, wherein the offset is based on whether the received packet is associated with the first descriptor ring or the second descriptor ring and wherein the number of buffers is based on whether the received packet is associated with the first descriptor ring or the second descriptor ring.

Example 11 includes one or more examples, wherein an offset associated with the first descriptor ring is different than an offset associated with the second descriptor ring.

Example 12 includes one or more examples, wherein the first descriptor ring is associated with a first virtualized execution environment and the second descriptor ring is associated with a second virtualized execution environment.

Example 13 includes one or more examples, wherein the first descriptor ring is associated with a first flow and the second descriptor ring is associated with a second flow.

Example 14 includes one or more examples, wherein the network interface device comprises one or more of: a network interface controller (NIC), SmartNIC, router, switch, forwarding element, infrastructure processing unit (IPU), data processing unit (DPU), or smart end point.

Example 15 includes one or more examples, and includes a method comprising: performing, at a network interface device: based on receipt of a packet, copying the received packet into a number of buffers based on whether the received packet is associated with a first descriptor ring or a second descriptor ring, wherein: a first number of buffers are allocated to store received packets associated with the first descriptor ring and a second number of buffers are allocated to store received packets associated with the second descriptor ring.

Example 16 includes one or more examples, and includes copying the received packet starting at an offset from a start of a starting buffer in a number of buffers, wherein the offset is based on whether the received packet is associated with the first descriptor ring or the second descriptor ring and wherein the number of buffers is based on whether the received packet is associated with the first descriptor ring or the second descriptor ring.

Example 17 includes one or more examples, wherein the first descriptor ring is associated with a first virtualized execution environment and the second descriptor ring is associated with a second virtualized execution environment.

Example 18 includes one or more examples, wherein the network interface device comprises one or more of: a network interface controller (NIC), SmartNIC, router, switch, forwarding element, infrastructure processing unit (IPU), data processing unit (DPU), or smart end point.

Example 19 includes one or more examples, wherein the received packet is accessed by one or more virtualized execution environments as virtio-networking or VMXNET3 virtual devices.

Example 20 includes one or more examples, wherein the network interface device is configured with the first number of buffers and the second number of buffers by a driver.

What is claimed is:
1. An apparatus comprising:
a network interface device comprising:
   a host interface;
   a network interface;
   a direct memory access (DMA) circuitry; and
   circuitry to:
      allocate a first number of buffers to store received packets associated with a first descriptor ring;
      allocate a second number of buffers to store received packets associated with a second descriptor ring; and
      based on receipt of a packet, copy the received packet into a number of buffers based on whether the received packet is associated with the first descriptor ring or the second descriptor ring, wherein the number of buffers allocated to store the received packet is based on a number of descriptors associated with the received packet and the number of buffers allocated to store the received packet is greater than one.

2. The apparatus of claim 1, wherein the circuitry is to:
copy the received packet starting at an offset from a start of a starting buffer in the number of buffers identified by the number of descriptors associated with the received packet, wherein the offset is based on whether the received packet is associated with the first descriptor ring or the second descriptor ring and wherein the number of buffers is based on whether the received packet is associated with the first descriptor ring or the second descriptor ring.

3. The apparatus of claim 2, wherein an offset associated with the first descriptor ring is different than an offset associated with the second descriptor ring.

4. The apparatus of claim 1, wherein
the first descriptor ring is associated with a first virtualized execution environment and
the second descriptor ring is associated with a second virtualized execution environment.

5. The apparatus of claim 1, wherein
the first descriptor ring is associated with a first flow and
the second descriptor ring is associated with a second flow.

6. The apparatus of claim 1, wherein the network interface device comprises one or more of: a network interface controller (NIC), SmartNIC, router, switch, forwarding element, infrastructure processing unit (IPU), data processing unit (DPU), or smart end point.

7. The apparatus of claim 1, wherein the received packet is accessed by one or more virtualized execution environments as virtio-networking or VMXNET3 virtual devices.

8. The apparatus of claim 1, comprising a host device to execute a driver to configure the circuitry with: the first number of buffers to store received packets associated with the first descriptor ring, an offset into a buffer to store a received packet associated with the first descriptor ring, the second number of buffers to store received packets associated with the second descriptor ring, and an offset into a buffer to store a received packet associated with the second descriptor ring.

9. The apparatus of claim 1, wherein:
the circuitry is to:
based on receipt of a second packet, copy the second received packet into a number of buffers based on whether the second received packet is associated with the first descriptor ring or the second descriptor ring, wherein the number of buffers allocated to store the second received packet is based on a number of descriptors associated with the second received packet and the number of buffers allocated to store the second received packet is one.

10. At least one non-transitory computer-readable medium comprising instructions stored thereon, that if executed by one or more processors, cause the one or more processors to:
execute a driver to configure a network interface device, when operational, to:
allocate a first number of buffers to store received packets associated with a first descriptor ring;
allocate a second number of buffers to store received packets associated with a second descriptor ring; and
based on receipt of a packet, copy the received packet into a number of buffers based on whether the received packet is associated with the first descriptor ring or the second descriptor ring, wherein the number of buffers allocated to store the received packet is based on a number of descriptors associated with the received packet and buffers identified in the descriptors associated with the received packet.

11. The computer-readable medium of claim 10, wherein the driver is to configure the network interface device, when operational, to
copy the received packet starting at an offset from a start of a starting buffer in a number of buffers, wherein the offset is based on whether the received packet is associated with the first descriptor ring or the second descriptor ring and wherein the number of buffers is based on whether the received packet is associated with the first descriptor ring or the second descriptor ring.

12. The computer-readable medium of claim 11, wherein an offset associated with the first descriptor ring is different than an offset associated with the second descriptor ring.

13. The computer-readable medium of claim 11, wherein the first descriptor ring is associated with a first virtualized execution environment and
the second descriptor ring is associated with a second virtualized execution environment.

14. The computer-readable medium of claim 11, wherein the first descriptor ring is associated with a first flow and the second descriptor ring is associated with a second flow.

15. The computer-readable medium of claim 11, wherein the network interface device comprises one or more of: a network interface controller (NIC), SmartNIC, router, switch, forwarding element, infrastructure processing unit (IPU), data processing unit (DPU), or smart end point.

16. A method comprising:
performing, at a network interface device:
based on receipt of a first packet, copying the first packet into a number of buffers based on whether the first packet being associated with a first descriptor ring or a second descriptor ring, wherein:
a first number of buffers are allocated to store the first packet associated with the first descriptor ring,
the first number of buffers is greater than one, and
buffers of the first number of buffers allocated to store the first packet are identified in multiple descriptors associated with the first packet.

17. The method of claim 16, comprising:
copying the first packet starting at an offset from a start of a starting buffer in the buffers of the first number of buffers, wherein the offset is based on whether the first packet is associated with the first descriptor ring or the second descriptor ring and wherein the number of buffers is based on whether the first packet is associated with the first descriptor ring or the second descriptor ring.

18. The method of claim 16, wherein
the first descriptor ring is associated with a first virtualized execution environment and
the second descriptor ring is associated with a second virtualized execution environment.

19. The method of claim 16, wherein the network interface device comprises one or more of: a network interface controller (NIC), SmartNIC, router, switch, forwarding element, infrastructure processing unit (IPU), data processing unit (DPU), or smart end point.

20. The method of claim 16, wherein the first packet is accessed by one or more virtualized execution environments as virtio-networking or VMXNET3 virtual devices.

21. The method of claim 16, wherein the network interface device is configured with the first number of buffers by a driver.

* * * * *